United States Patent
Hsiang et al.

(10) Patent No.: US 9,417,717 B2
(45) Date of Patent: Aug. 16, 2016

(54) METHODS FOR INTERACTING WITH AN ELECTRONIC DEVICE BY USING A STYLUS COMPRISING BODY HAVING CONDUCTIVE PORTION AND SYSTEMS UTILIZING THE SAME

(71) Applicant: HTC CORPORATION, Taoyuan, Taoyuan County (TW)

(72) Inventors: Ko-Hsin Hsiang, Taoyuan (TW); Pi-Lin Lo, Taoyuan (TW); Peter Dao-Chun Shann, Taoyuan (TW); Jui-Liang Chen, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 50 days.

(21) Appl. No.: 13/972,494

(22) Filed: Aug. 21, 2013

(65) Prior Publication Data
US 2015/0054751 A1 Feb. 26, 2015

(51) Int. Cl.
*G06F 3/0354* (2013.01)
*G06F 3/0488* (2013.01)
*G06F 3/041* (2006.01)

(52) U.S. Cl.
CPC ............ *G06F 3/03545* (2013.01); *G06F 3/041* (2013.01); *G06F 3/04883* (2013.01)

(58) Field of Classification Search
CPC ..... G06F 3/03545; G06F 3/044; G06K 9/222; G06K 9/24
USPC ........................................ 345/179; 178/19.03
See application file for complete search history.

(56) References Cited

U.S. PATENT DOCUMENTS

| | | | | |
|---|---|---|---|---|
| 6,028,594 | A * | 2/2000 | Inoue | G06F 3/0416 345/159 |
| 6,624,832 | B1 * | 9/2003 | Thomas | 715/863 |
| 2009/0273585 | A1 | 11/2009 | De Haan et al. | |
| 2011/0001708 | A1 * | 1/2011 | Sleeman | G06F 3/0416 345/173 |
| 2011/0234548 | A1 * | 9/2011 | Liang | G06F 3/03545 345/179 |
| 2011/0273376 | A1 * | 11/2011 | Dickinson | G06F 3/03545 345/173 |
| 2012/0313865 | A1 | 12/2012 | Pearce | |
| 2012/0327013 | A1 | 12/2012 | Lee et al. | |
| 2012/0327042 | A1 * | 12/2012 | Harley et al. | 345/179 |

(Continued)

FOREIGN PATENT DOCUMENTS

| EP | 1993029 A1 | 11/2008 |
|---|---|---|
| TW | 200844816 A | 11/2008 |

(Continued)

OTHER PUBLICATIONS

European Office Communication dated Oct. 23, 2015 for European Application No. 14175461.4.

*Primary Examiner* — Liliana Cerullo
(74) *Attorney, Agent, or Firm* — Birch, Stewart, Kolasch & Birch, LLP

(57) ABSTRACT

A system includes a stylus including a body having an elongated portion, a tapered portion coupled to the elongated portion, and a conductive layer disposed on the elongated portion, an electronic device, a touch controller and a processing unit. The electronic device comprises a touch sensor generating a sensing signal when the touch sensor senses the conductive layer. The touch controller is coupled to the touch sensor, receives the sensing signal and generates a first signal based on the received sensing signal. The processing unit is coupled to the touch controller, receives the first signal and triggers a function of the electronic device based on the first signal.

19 Claims, 7 Drawing Sheets

(56) References Cited

U.S. PATENT DOCUMENTS

| | | |
|---|---|---|
| 2013/0162604 A1 | 6/2013 | Wang et al. |
| 2014/0210748 A1* | 7/2014 | Narita .................. G06F 3/0354 345/173 |
| 2014/0306928 A1* | 10/2014 | Pedersen et al. .............. 345/174 |

FOREIGN PATENT DOCUMENTS

| | | |
|---|---|---|
| TW | M423863 U1 | 3/2012 |
| TW | M442543 U1 | 12/2012 |
| WO | WO 2013/054155 A1 | 4/2013 |

\* cited by examiner

METHODS FOR INTERACTING WITH AN ELECTRONIC DEVICE BY USING A STYLUS COMPRISING BODY HAVING CONDUCTIVE PORTION AND SYSTEMS UTILIZING THE SAME

BACKGROUND OF THE INVENTION

1. Field of the Invention

The invention relates to an electronic device and a system with a stylus comprising a body having a conductive portion and a method for interacting with an electronic device by using a stylus comprising a body having a conductive portion.

2. Description of the Related Art

Touch techniques are widely applied to various electronic products. Generally, touch techniques can be divided into five types, such as a resistive type, capacitive type, surface acoustic wave type, optics type and electromagnetic type, according to the induction principle. The resistive type touch panel utilizes a pressing manner to allow an upper conductive film to contact with a lower conductive film, thereby allowing for operation of a sensitive touch panel. The capacitive type touch panel may be barely touched by a user's fingers to generate variations of capacitance between the user's fingers and the capacitive type touch panel so as to operate the capacitive type touch panel. In other words, the capacitive type touch panel is more sensitive than the resistive type touch panel.

Moreover, the capacitive type touch panel has additional advantages of being dustproof, flameproof, and scratch resistant and having high resolution, high transmittance, low reflection, high contrast ratio, greater durability, and multi-touch and gesture operation ability when compared with the resistive type touch panel, and thus, is now aggressively being developed by many companies.

Since using touch panel is a trend for modern electronic products, how to enhance the functionality of the touch panel in an electronic product is a topic of interest.

BRIEF SUMMARY OF THE INVENTION

Systems and methods for interacting with an electronic device by using a stylus are provided. An exemplary embodiment of a system comprises a stylus including a body having an elongated portion, a tapered portion coupled to the elongated portion, and a conductive layer disposed on the elongated portion, an electronic device, a touch controller and a processing unit. The electronic device comprises a touch sensor generating a sensing signal when the touch sensor senses the conductive layer. The touch controller is coupled to the touch sensor, receives the sensing signal and generates a first signal based on the received sensing signal. The processing unit is coupled to the touch controller, receives the first signal and triggers a function of the electronic device based on the first signal.

An exemplary embodiment of a method for interacting with an electronic device by using a stylus comprising a body having an elongated portion, a tapered portion coupled to the elongated portion, and a conductive layer disposed on the elongated portion, comprises: generating a sensing signal when a touch sensor of the electronic device senses the conductive layer; and triggering a function of the electronic device based on the sensing signal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
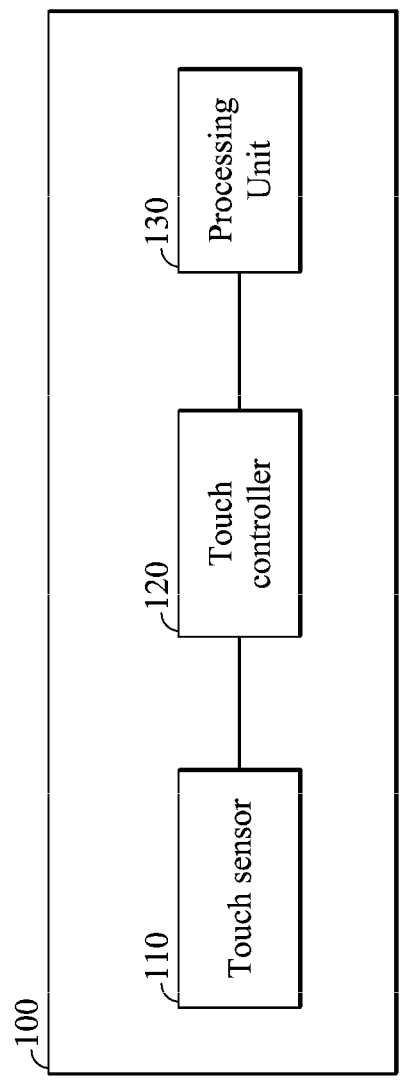
FIG. 1 is a block diagram of an electronic device according to an embodiment of the invention.

FIG. 1 is a block diagram of an electronic device according to an embodiment of the invention. The electronic device 100 may at least comprise a touch sensor 110, a touch controller 120 and a processing unit 130. According to an embodiment of the invention, the electronic device 100 may be a portable or hand-held electronic device, such as a personal digital assistant (PDA), a digital camera, a notebook computer, a tablet, a portable gaming device, a portable multimedia player, or others. Note that for simplicity, FIG. 1 presents a simplified block diagram, in which only the elements relevant to the invention are shown. However, the invention should not be limited that shown in FIG. 1.

The touch sensor 110 may comprise a sensing matrix (not shown) formed by a plurality of sensing points for generating raw data to represent sensing results. The sensing points define a touch window capable of sensing touch events, such as the touch window 410 as shown in FIG. 4. The touch sensor 110 may further output the raw data to the touch controller 120. For example, the touch sensor 110 may generate a sensing signal containing information related to the raw data and output the sensing signal. The touch controller 120 may be a touch IC for analyzing the raw data or the sensing signal to identify any touch event on the touch sensor 110, and may further determine gestures or instructions inputted by the user of the electronic device 100. The processing unit 130 receives information regarding the determined gestures or instructions from the touch controller 120, and trigger corresponding functions that have been predefined and/or assigned to the gestures or instructions. Note that in some embodiments of the invention, the processing unit 130 may also determine the gestures or instructions inputted by the user of the electronic device 100 and trigger corresponding functions that have been predefined and/or assigned to the gestures or instructions.

Figure 2:
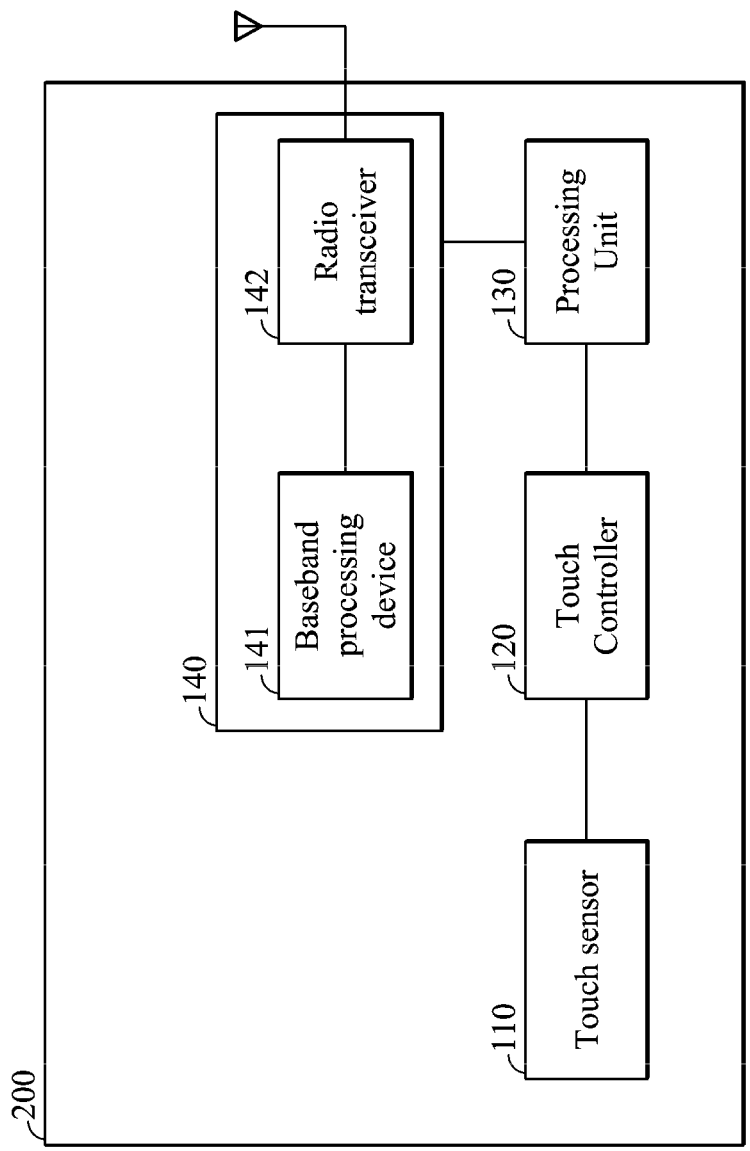
FIG. 2 is a block diagram of an electronic device according to another embodiment of the invention.

FIG. 2 is a block diagram of an electronic device according to another embodiment of the invention. The electronic device 200 may at least comprise a touch sensor 110, a touch controller 120, a processing unit 130 and a radio module 140 capable of providing wireless communications. According to an embodiment of the invention, the electronic device 200 may be a portable or hand-held electronic device, such as a personal digital assistant (PDA), a digital camera, a notebook computer, a tablet, a portable gaming device, a portable multimedia player, a cellular phone, a Global Positioning System (GPS) receiver or others.

The radio module 140 may at least comprise an antenna, a baseband processing device 141 and a radio transceiver 142. The radio transceiver 142 may receive wireless radio frequency signals via the antenna, convert the received signals to baseband signals to be processed by the baseband processing device 141, or receive baseband signals from the baseband processing device 141 and convert the received signals to wireless radio frequency signals to be transmitted. The radio transceiver 142 may comprise a plurality of hardware devices to perform radio frequency conversion. For example, the radio transceiver 142 may comprise a mixer to multiply the baseband signals with a carrier oscillated in the radio frequency of a corresponding wireless communications system.

The baseband processing device 141 may further convert the baseband signals to a plurality of digital signals, and process the digital signals, and vice versa. The baseband processing device 141 may also comprise a plurality of hardware devices to perform baseband signal processing. The baseband signal processing may comprise analog to digital conversion (ADC)/digital to analog conversion (DAC), gain adjustment, modulation/demodulation, encoding/decoding, and so on. Note that in some other embodiments of the invention, the processing unit 130 may also be integrated in the baseband processing device 141, and the invention should not be limited thereto.

Note that for simplicity, FIG. 2 presents a simplified block diagram, in which only the elements relevant to the invention are shown. However, the invention should not be limited that shown in FIG. 2. In addition, since non-discussed elements shown in FIG. 2 are the same as those shown in FIG. 1, references may be made to FIG. 1, thus, they are omitted here for brevity.

Figure 3:
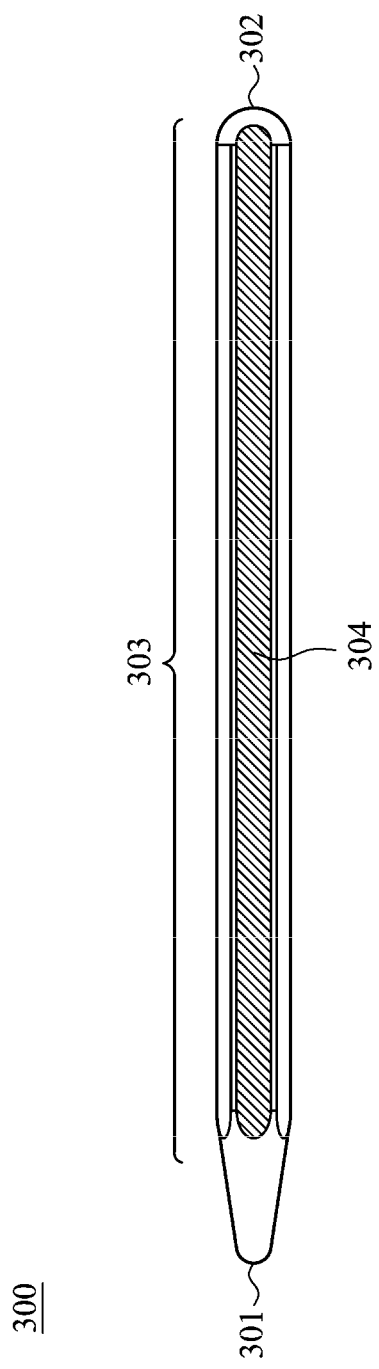
FIG. 3 shows a schematic diagram of an exemplary stylus according to an embodiment of the invention.

FIG. 3 shows a schematic diagram of an exemplary stylus according to an embodiment of the invention. According to an embodiment of the invention, the stylus 300 may be or may be not a portion of the proposed electronic devices (such as the electronic devices 100 and 200 shown in FIG. 1 and FIG. 2). When the stylus 300 is a portion of the proposed electronic devices, the stylus 300 may be a detachable stylus plugged into a socket of the electronic device, and may be pulled out for operating a touch panel of the electronic device when required. The stylus 300 together with the proposed electronic devices (such as the electronic devices 100 and 200 shown in FIG. 1 and FIG. 2) may be regarded as a system. Note that it does not matter whether the stylus 300 is or is not a part of the proposed electronic devices, in the following paragraph, the term "stylus" instead of "detachable stylus" is used for simplicity.

According to an embodiment of the invention, the stylus 300 may at least comprise a body having an elongated portion 303, a tapered portion 301 coupled to the elongated portion, and a back-end 302. A conductive layer may be disposed on the elongated portion 303 to form a conductive portion, such as the conductive portion 304 with a predetermined shape (the shape filled with slashes). According to an embodiment of the invention, the conductive layer may cover a surface of the elongated portion 303 to form the predetermined shape at one side of the elongated portion 303. According to another embodiment of the invention, the conductive layer may cover a surface of the tapered portion 301 and the elongated portion 303 to form the predetermined shape at one side of the elongated portion 303. A length of the predetermined shape may be designed equal to or exceed a length of one side of the touch sensor 110 or the touch window (such as the touch window 410 as shown in FIG. 4) of the touch sensor 110. Note that the shape of the stylus 300 and the shape of the conductive portion 304 shown in FIG. 3 are merely examples for illustrating the invention concept, and the invention should not be limited thereto. Those who are skilled in this technology can still make various alterations and modifications, without departing from the scope and spirit of this invention, to implement a stylus with any other shape or style and the conductive portion in the body of the stylus with any other shape or style.

Note further that, the predetermined shape may also be defined by an area, a width, a height, a flatness and/or any combination of the conductive portion or the conductive layer. In addition, the shape, the area, the width, the height, the flatness and/or any combination of the conductive portion or the conductive layer may also be used as one or more factors for detecting the touch event(s) of the stylus on the touch panel or touch window of the touch sensor. Therefore, the invention should not be limited to either one.

According to an embodiment of the invention, a surface of the body of the stylus may be covered with or comprise the conductive layer in the predetermined shape, so as to create a conductive portion in the predetermined shape in the body of the stylus. The conductive material may be, for example but not limited to, a metal, a conductive rubber, or others. Note that the conductive material may not be spread on the top layer of the surface of the body. For example, there may still be a thin insulating layer covered above the conductive layer, without greatly affecting the conductivity of the body of the stylus.

Figure 4A:
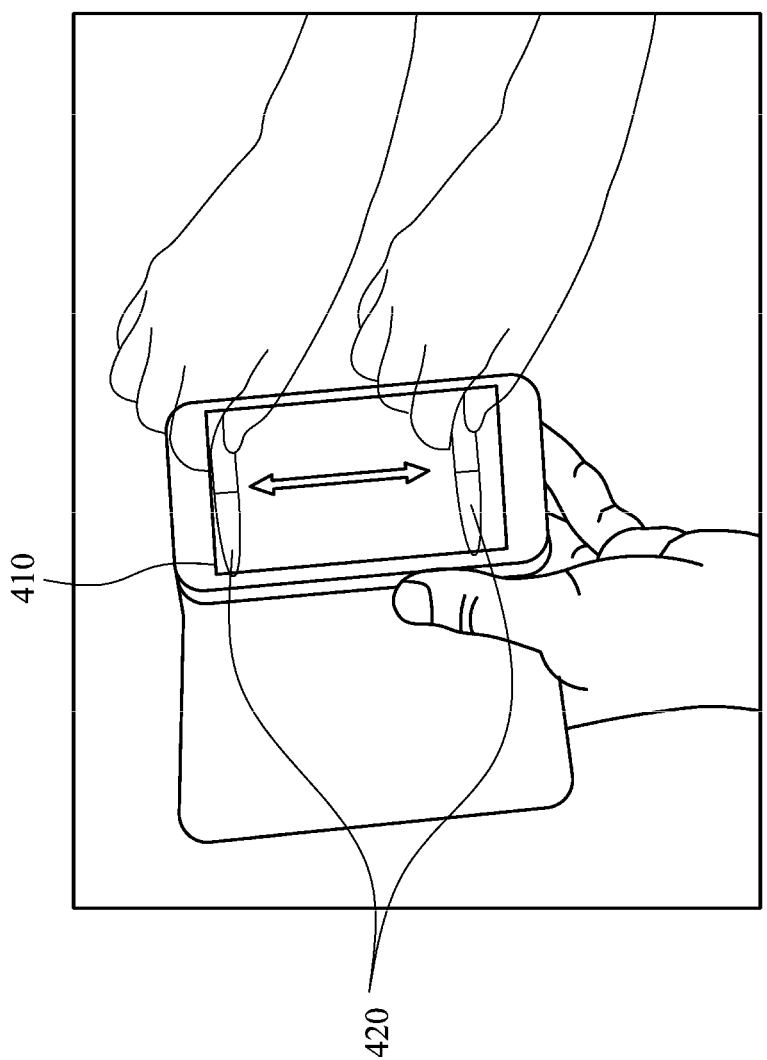
FIG. 4A shows an exemplary slide operation on the touch panel by using a body of the stylus to touch the touch window of an electronic device according to an embodiment of the invention.

FIG. 4A shows an exemplary slide operation on the touch panel by using a body of the stylus to touch the touch window 410 of an electronic device according to an embodiment of the invention. As shown in FIG. 4A, the body of the stylus 420 is placed on or touches the touch panel, and the user holding the stylus moves the stylus from one horizontal side of the touch window 410 to another. Therefore, the body of the stylus continuously touches the surface of the touch window 410.

Figure 4B:
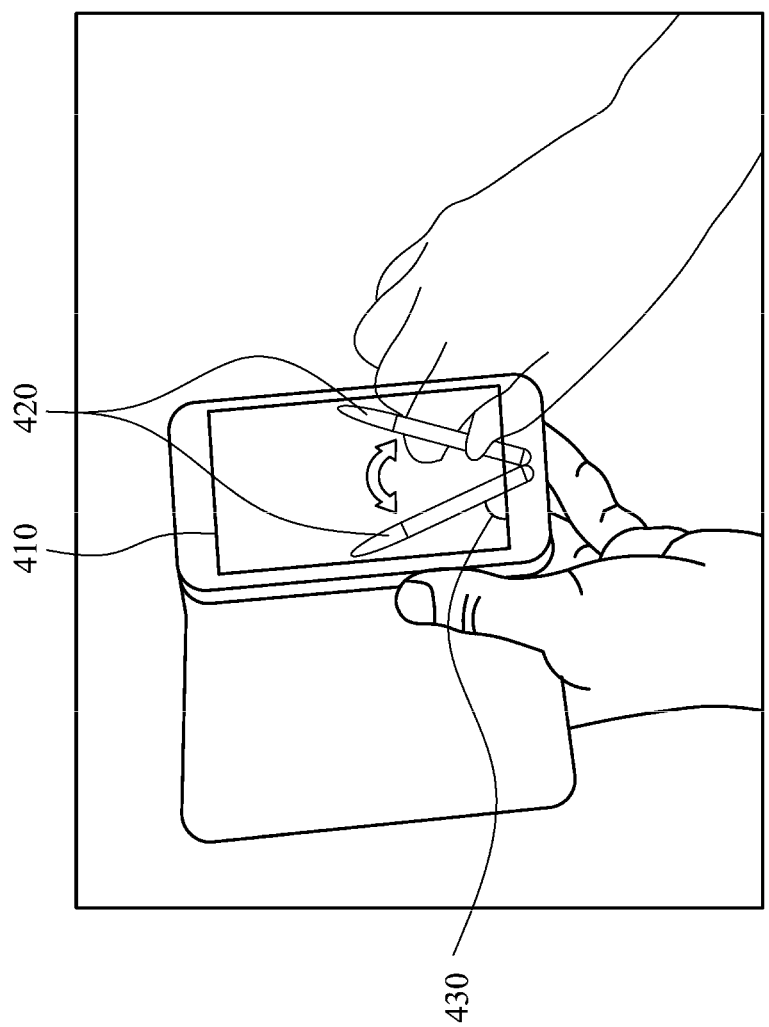
FIG. 4B shows an exemplary sweep operation on the touch panel by using a body of the stylus to touch the touch window 410 of an electronic device according to another embodiment of the invention.

FIG. 4B shows an exemplary sweep operation on the touch panel by using a body of the stylus to touch the touch window 410 of an electronic device according to another embodiment of the invention. As shown in FIG. 4B, the body of the stylus 420 is placed on or touches the touch panel, and the user holding the stylus sweeps the stylus over the touch window 410. Note that there may still be a variety of operations that can be performed on the touch panel by using the proposed stylus. The operations shown in FIG. 4A and FIG. 4B are merely some examples and the invention should not be limited thereto.

According to an embodiment of the invention, the touch sensor 110 may generate a sensing signal when the touch sensor 110 senses the conductive layer. For example, the touch sensor 110 may sense the predetermined shape of the conductive portion or conductive layer. The touch controller 120 may receive the sensing signal and generate a first signal based on the sensing signal. The processing unit 130 may further receive the first signal and trigger a function of the electronic device based on the first signal.

Figure 5:
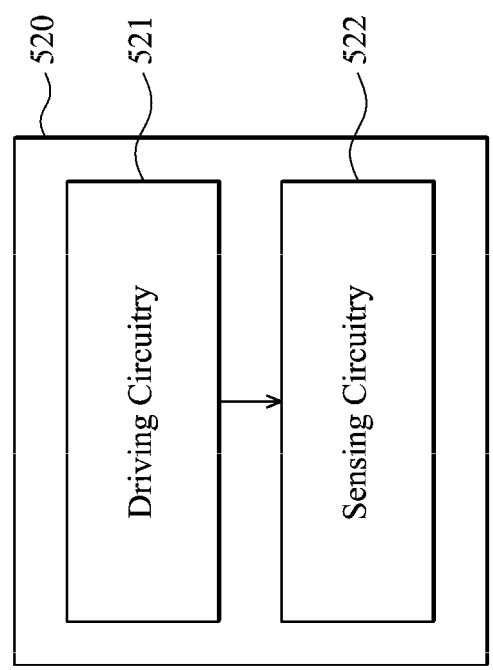
FIG. 5 shows an exemplary block diagram of a touch controller according to an embodiment of the invention.

FIG. 5 shows an exemplary block diagram of a touch controller according to an embodiment of the invention. The touch controller 520 may comprise a driving circuitry 521 coupled to the touch sensor 110 for driving the touch sensor 110 and a sensing circuitry 522 coupled to the touch sensor 110 and the processing unit 130 for receiving the sensing signal.

Figure 6:
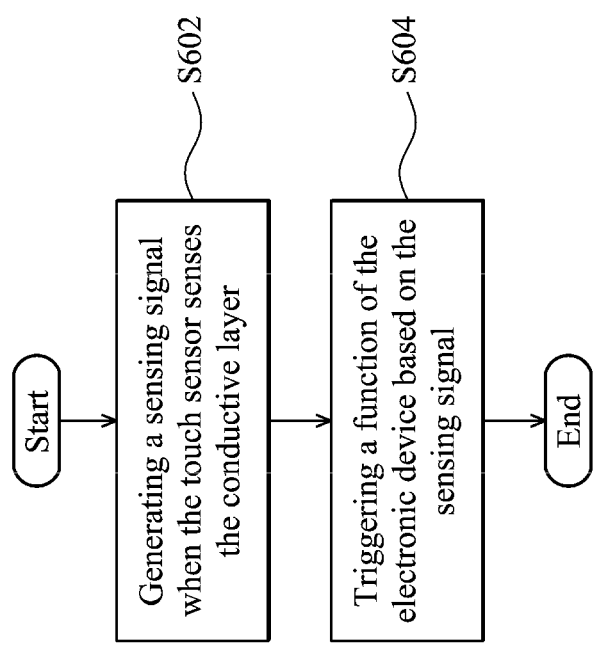
FIG. 6 shows a flow chart of a method for interacting with an electronic device by using a stylus according to an embodiment of the invention.

FIG. 6 shows a flow chart of a method for interacting with an electronic device by using a stylus according to an embodiment of the invention. First of all, a sensing signal is generated when the touch sensor senses the conductive layer (Step S602). Next, a function of the electronic device is triggered based on the sensing signal (Step S604).

Accompanying with the elements shown in FIG. 1 and FIG. 2, methods for interacting with an electronic device by using a stylus are discussed in more detailed in the following paragraphs.

According to an embodiment of the invention, the touch controller 120 may receive the sensing signal from the touch sensor 110 and detect one or more touch event(s) of the stylus on the touch sensor 110 according to the sensing signal. For example, the touch controller 120 may determine whether a shape of a touched area on the touch sensor 110 matches with the predetermined shape according to the raw data, so as to verify whether the one or more touch event(s) is/are generated by the stylus. The predetermined shape of the conductive portion of the stylus may be predefined and stored in a memory (not shown) of the electronic device 100/200.

Note that as discussed above, the predetermined shape may also be defined by an area, a width, a height, a flatness and/or any combination of the conductive portion or the conductive layer. In addition, the shape, the area, the width, the height, the flatness and/or any combination of the conductive portion or the conductive layer may also be used as one or more factors for detecting the touch event(s) of the stylus on the touch panel. Therefore, the invention should not be limited to either one.

When it is determined that the one or more touch event(s) is/are generated by the stylus, the touch controller 120 may further determine a coordinate of the predetermined shape on the touch window of the touch sensor 110 and generate the first signal which contains information related to the coordinate. The processing unit 130 receiving the first signal may further determine a movement or velocity of the predetermined shape on the touch window of the touch sensor 110 based on the received first signal over a period of time and trigger a function of the electronic device 100/200 based on the movement or velocity determined from the received first signal. For example, the touch controller 120 may determine a first coordinate of the predetermined shape on the touch window of the touch sensor 110 when determined that an touch event is generated by the stylus at a first time, determine a second coordinate of the predetermined shape on the touch window of the touch sensor 110 at a second time after the first time, determine a third coordinate . . . , and so on.

Thus, the processing unit 130 receiving the first signal may determine a movement or velocity of the predetermined shape on the touch window of the touch sensor 110 based on the first coordinate, the second coordinate, the third coordinate, and so on, contained in the received first signal over a period of time. The movement of the predetermined shape may be, for example, a direction, a distance and/or a type of the motion. The type of the motion may be sliding, scrolling, rolling, rotating, sweeping, or others.

According to another embodiment of the invention, the touch controller 120 may also determine the coordinate of the predetermined shape on the touch sensor based on the sensing signal, determine a movement or velocity of the predetermined shape on the touch window of the touch sensor 110 based on the coordinate collected over a period of time and generate the first signal which contains information related to the movement or velocity of the predetermined shape on the touch window of the touch sensor 110. The processing unit 130 receiving the first signal may trigger a function of the electronic device based on the information related the movement or velocity of the predetermined shape on the touch sensor 110.

According to yet another embodiment of the invention, the touch controller 120 may further determine an angle of the stylus on the touch window of the touch sensor 110 with respect to a side of the touch sensor 110 based on the sensing signal, such as the angle 430 as shown in FIG. 4B, and generate the first signal which contains information related to the angle of the stylus. The processing unit 130 receiving the first signal may trigger a function of the electronic device based on the information related the angle of the stylus.

Or, according to still another embodiment of the invention, the touch controller 120 may determine a coordinate of the predetermined shape on the touch window of the touch sensor 110 and generate the first signal which contains information related to the coordinate. The processing unit 130 receiving the first signal may further determine an angle of the stylus on the touch window of the touch sensor 110 with respect to a side of the touch sensor 110 based on the first signal and trigger a function of the electronic device based on the information related the angle of the stylus.

According to still another embodiment of the invention, the touch controller 120 may also determine a gesture generated by the stylus and generate the first signal which contains information related to the gesture. The processing unit 130 receiving the first signal may trigger a function of the electronic device based on the information related the gesture.

Or, according to still another embodiment of the invention, the touch controller 120 may determine a coordinate of the predetermined shape on the touch window of the touch sensor 110 and generate the first signal which contains information related to the coordinate. The processing unit 130 receiving the first signal over a period of time may further determine a gesture generated by the stylus and trigger a function of the electronic device based on the information related the gesture of the stylus.

According to an embodiment of the invention, there may be a plurality of predefined functions that can be executed by the electronic device and each movement and/or velocity of the stylus, which may be detected by the predetermined shape as discussed above, may correspond to a predefined function. Therefore, when the movement and/or velocity of the stylus is determined, the processing unit 130 may further identify one or more function(s) according to the determined movement and/or velocity and trigger execution of the function(s).

According to another embodiment of the invention, there may also be a plurality of predefined functions that can be executed by the electronic device, and each gesture generated by the stylus, which may be detected by the predetermined shape as discussed above, may correspond to a predefined function. Therefore, when the gesture generated by the stylus is determined, the processing unit 130 may further identify the corresponding function(s) and trigger execution of the function(s).

According to yet another embodiment of the invention, there may also be functions predefined for the stylus when the stylus is motionless. For example, different functions may be defined for the cases when the stylus is placed still on the touch panel with different angles. Therefore, when the angle of the stylus, which may be determined by the predetermined shape as discussed above, is determined, the processing unit 130 may further identify the corresponding function(s) and trigger execution of the function(s).

For example, when the touch controller 120 or processing unit 130 determines that the user holding the stylus slides the stylus from the top to the bottom of the touch panel (or, for example, continuously uses the body of the stylus to touch from one side of the touch panel to another), a print screen instruction inputted by the user may be identified. Therefore, the processing unit 130 may trigger execution of the print screen function. For another example, when the touch controller 120 detects that the user holding the stylus sweeps the stylus over the touch window, an open calendar instruction inputted by the user may be identified. Therefore, the processing unit 130 may activate the calendar application program.

Note that there may be still a plurality of motions, gestures and angles of the stylus on the touch panel and a plurality of function(s) of the electronic device can be flexibly defined and applied in the proposed stylus, proposed electronic device and proposed system. Therefore, the invention should not be limited to the examples discussed above. In addition, note that in the conventional design, since the user can only use the tip or the tapered portion of the stylus to touch or control the touch panel of the electronic device, only the "point" and/or "click" operations on the touch panel can be detected. However, since the proposed stylus has a conductive portion with a predetermined shape in the body, not only the tip or the tapered portion of the stylus but also the stylus body can be used to touch or control the touch panel. In addition, since of the stylus body can now be used to touch or control the touch panel, there are more operations, such as sliding, scrolling, rolling, rotating, sweeping on the touch panel, or just holding the stylus still on the touch panel with a predefined angle, or others, can be developed and detected for interacting with the electronic device.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A system, comprising:
    a stylus, comprising a body having an elongated portion, a tapered portion coupled to the elongated portion, and a conductive layer covering the elongated portion of the body, a conductive layer covering the elongated portion of the body, the elongated portion that is covered with the conductive layer is longer than the tapered portion, and the conductive layer forming a predetermined shape at one side of the elongated portion;
    an electronic device, comprising a touch sensor generating a sensing signal according to the predetermined shape of the conductive layer when the elongated portion of the stylus is positioned substantially parallel with the touch sensor, the touch sensor senses the elongated portion via the predetermined shape of the conductive layer;
    a touch controller, coupled to the touch sensor, receiving the sensing signal and generating a first signal based on the received sensing signal; and
    a processing unit, coupled to the touch controller, receiving the first signal and triggering a function of the electronic device based on the first signal.

2. The system as claimed in claim 1, wherein the conductive layer has a predetermined shape and the sensing signal is generated based on sensing of the predetermined shape of the conductive layer.

3. The system as claimed in claim 2, wherein a length of the predetermined shape equals to or exceeds a length of one side of the touch sensor.

4. The system as claimed in claim 2, wherein the touch controller further determines a first coordinate of the predetermined shape on the touch sensor based on the sensing signal and generates the first signal which contains information related to the first coordinate.

5. The system as claimed in claim 2, wherein the processing unit further determines a velocity of the predetermined shape of the stylus moving on the touch sensor based on the received first signal over a period of time and triggers the function of the electronic device based on the velocity determined from the received first signal.

6. The system as claimed in claim 2, wherein the touch controller further determines a first coordinate of the predetermined shape on the touch sensor based on the sensing signal, determines a movement or velocity of the predetermined shape on the touch sensor based on the first coordinate over a period of time and generates the first signal which contains information related to the movement or velocity of the predetermined shape on the touch sensor.

7. The system as claimed in claim 6, wherein the processing unit receives the first signal and triggers the function of the electronic device based on the information related the movement or velocity of the predetermined shape on the touch sensor.

8. The system as claimed in claim 1, wherein the conductive layer covers a surface of the elongated portion to form a predetermined shape at one side of the elongated portion and the sensing signal is generated based on sensing of the predetermined shape of the conductive layer.

9. The system as claimed in claim 1, wherein the touch controller comprises a driving circuitry coupled to the touch sensor for driving the touch sensor and a sensing circuitry coupled to the touch sensor and the processing unit for receiving the sensing signal.

10. The system as claimed in claim 1, wherein the touch controller further determines an angle of the stylus on the touch sensor with respect to a side of the touch sensor based on the sensing signal.

11. A method for interacting with an electronic device by using a stylus comprising a body having an elongated portion, a tapered portion coupled to the elongated portion, and a conductive layer covering the elongated portion of the body, the elongated portion that is covered with the conductive layer is longer than the tapered portion, and the conductive layer forming a predetermined shape at one side of the elongated portion, comprising:
    generating a sensing signal according to the predetermined shape of the conductive layer when the elongated portion of the stylus is positioned substantially parallel with the touch sensor, a touch sensor of the electronic device senses the predetermined shape of the elongated portion via the conductive layer; and
    triggering a function of the electronic device based on the sensing signal.

12. The method as claimed in claim 11, wherein the conductive layer has a predetermined shape and the sensing signal is generated based on sensing of the predetermined shape of the conductive layer.

13. The method as claimed in claim 12, wherein a length of the predetermined shape equals to or exceeds a length of one side of the touch sensor.

14. The method as claimed in claim 12, further comprising:
    determining a first coordinate of the predetermined shape on the touch sensor based on the sensing signal;

generating a first signal which contains information related to the first coordinate; and triggering the function of the electronic device based on the first signal.

15. The method as claimed in claim 12, further comprising:
determining a velocity of the predetermined shape of the stylus moving on the touch sensor based on the sensing signal over a period of time; and triggering the function of the electronic device based on the velocity determined from the received sensing signal.

16. The method as claimed in claim 12, further comprising:
determining a first coordinate of the predetermined shape on the touch sensor based on the sensing signal;

determining a movement or velocity of the predetermined shape on the touch sensor based on the first coordinate over a period of time; and generating a first signal which contains information related to the movement or velocity of the predetermined shape on the touch sensor.

17. The method as claimed in claim 16, wherein the step of triggering a function of the electronic device based on the sensing signal further comprising:

receiving the first signal to obtain information related to the movement or velocity of the predetermined shape on the touch sensor; and triggering the function of the electronic device based on the information related the movement or velocity of the predetermined shape on the touch sensor.

18. The method as claimed in claim 12, further comprising:
determining an angle of the stylus on the touch sensor with respect to a side of the touch sensor based on the sensing signal;

generating a first signal which contains information related to the angle; and triggering the function of the electronic device based on the first signal.

19. The method as claimed in claim 11, wherein the conductive layer covers a surface of the elongated portion to form a predetermined shape at one side of the elongated portion and the sensing signal is generated based on sensing of the predetermined shape of the conductive layer.

* * * * *